US010938554B2

(12) United States Patent
Sullivan et al.

(10) Patent No.: US 10,938,554 B2
(45) Date of Patent: *Mar. 2, 2021

(54) MANAGING PRIVATE KEY ACCESS IN MULTIPLE NODES

(71) Applicant: Cloudflare, Inc., San Francisco, CA (US)

(72) Inventors: Nicholas Thomas Sullivan, San Francisco, CA (US); Brendan Scott McMillion, Redwood City, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 16/241,888

(22) Filed: Jan. 7, 2019

(65) Prior Publication Data

US 2019/0140825 A1    May 9, 2019

Related U.S. Application Data

(63) Continuation of application No. 15/828,123, filed on Nov. 30, 2017, now Pat. No. 10,177,909.

(Continued)

(51) Int. Cl.
*H04L 9/08*     (2006.01)
*H04L 9/14*     (2006.01)

(52) U.S. Cl.
CPC .......... *H04L 9/0822* (2013.01); *H04L 9/085* (2013.01); *H04L 9/088* (2013.01); *H04L 9/0847* (2013.01);

(Continued)

(58) Field of Classification Search
CPC ... H04L 9/0822; H04L 9/0847; H04L 9/0891; H04L 9/088; H04L 9/085; H04L 9/14;

(Continued)

(56) References Cited

U.S. PATENT DOCUMENTS 9,954,680 B1 *    4/2018    Machani ................. H04L 9/085

OTHER PUBLICATIONS

Boneh D., et al., "Identity-Based Encryption from the Weil Pairing," Appears in SIAM J. of Computing, 2003, vol. 32 (3), pp. 586-615, and the Proceedings of Crypto 2001, vol. 2139 of Lecture Notes in Computer Science, pp. 213-229, Springer-Verlag, 2001.

(Continued)

*Primary Examiner* — Mohammed Waliullah
(74) *Attorney, Agent, or Firm* — Nicholson De Vos Webster & Elliott LLP

(57) ABSTRACT

Managing private key access in multiple nodes is described. A piece of data (e.g., a private key) is encrypted using identity-based broadcast encryption and identity-based revocation encryption so that only certain servers in a distributed network of servers can decrypt the piece of data. The piece of data is encrypted with a key encryption key (KEK). The KEK is split into two pieces. The first piece is encrypted using identity-based broadcast encryption with a first set of identities as input such that only servers of the first set of identities can decrypt the first piece, and the second piece is encrypted using identity-based revocation encryption so that all servers except those that have the second set of identities can decrypt the second piece. The keys are transmitted to the servers.

24 Claims, 4 Drawing Sheets

Related U.S. Application Data

(60) Provisional application No. 62/563,627, filed on Sep. 26, 2017.

(52) U.S. Cl.
CPC .......... H04L 9/0861 (2013.01); H04L 9/0891 (2013.01); H04L 9/0894 (2013.01); H04L 9/14 (2013.01); *H04L 2209/601* (2013.01)

(58) Field of Classification Search
CPC .......................... H04L 9/0894; H04L 9/0861; H04L 2209/601
See application file for complete search history.

(56) References Cited

OTHER PUBLICATIONS

Delerablee C., "Identity-Based Broadcast Encryption with Constant Size Ciphertexts and Private Keys," International Association for Cryptology Research 2007, ASIACRYPT 2007, LNCS 4833, 2007, pp. 200-215.
Libert B., et al., "Expressive Key-Policy Attribute-Based Encryption with Constant-Size Ciphertexts," ResearchGate, Conference Paper, Mar. 2011, 23 pages.
Menezes A., "An Introduction to Pairing-Based Cryptography," Mathematics Subject Classification, 1991, 19 pages.
Notice of Allowance from U.S. Appl. No. 15/828,123, dated Aug. 31, 2018, 8 pages.
Non-Final Office Action from U.S. Appl. No. 15/828,123, dated Mar. 13, 2018, 10 pages.
Shamir A., "Identity-Based Cryptosystems and Signature Schemes," Advances in Cryptology—CRYPTO '84, LNCS 196, 1985, pp. 47-53.

* cited by examiner

MANAGING PRIVATE KEY ACCESS IN MULTIPLE NODES

CROSS-REFERENCE TO RELATED APPLICATIONS

This application is a continuation of U.S. application Ser. No. 15/828,123, filed Nov. 30, 2017, which claims the benefit of U.S. Provisional Application No. 62/563,627, filed Sep. 26, 2017, which are hereby incorporated by reference.

TECHNICAL FIELD

Embodiments of the invention relate to the field of computer security; and more specifically to managing private key access in multiple nodes.

BACKGROUND

It is common to encrypt data to provide security for the data. In symmetric key encryption, the plaintext (the data to be encrypted) is encrypted with a key (generating ciphertext) and that same key is capable of decrypting the data. In asymmetric encryption (e.g., public key encryption), the encryption key is public (e.g., published for anyone to use and encrypt messages) and the decryption key is private. Thus, while anyone can encrypt the data using the public key, only the intended recipient can decrypt the data using the private decryption key. Most encryption techniques require knowledge of a single key in order to decrypt the encrypted data.

Identity-based encryption techniques use an identity as the public key. In identity-based broadcast encryption, the data is encrypted and can be decrypted only by a specific set of recipients (like a whitelist). In identity-based revocation encryption, the data is encrypted so that all recipients can decrypt except for a pre-defined set of recipients (like a blacklist).

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
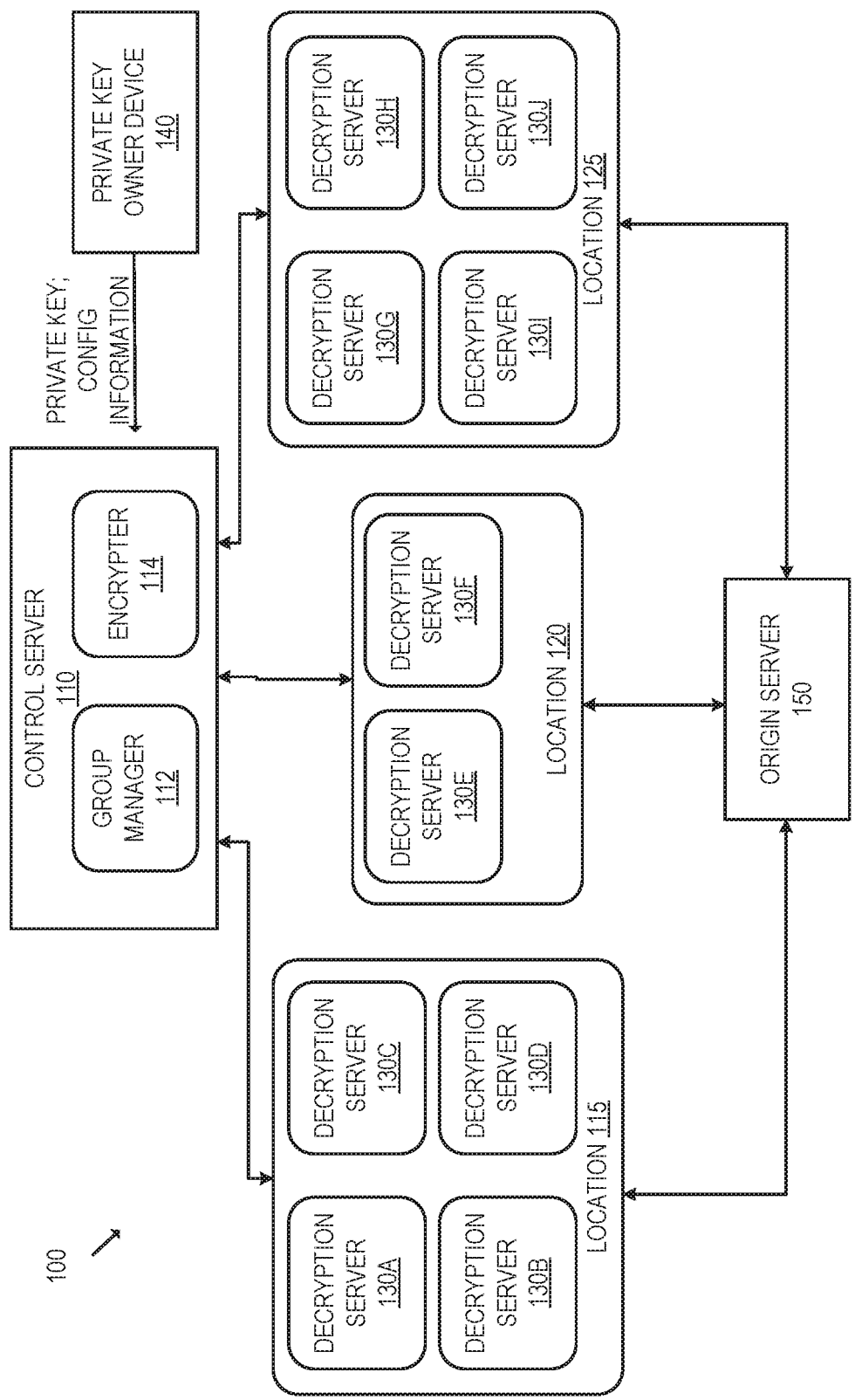
FIG. 1 illustrates a system for encrypting and decrypting a piece of data (e.g., a private key) using identity-based broadcast encryption and identity-based revocation encryption so that only certain servers in a distributed network of servers can decrypt the piece of data, according to an embodiment.

A method and apparatus for managing private key access in multiple nodes is described. In an embodiment, a piece of data (e.g., a private key) is encrypted using identity-based broadcast encryption and identity-based revocation so that only certain servers in a distributed network of servers can decrypt the piece of data. Each server of the distributed network of servers is assigned multiple identity information such as location (e.g., a region, a country, a city, etc.) and server identifier (e.g., name, server number, etc.). For each server, there is an identity-based encryption private key that is provisioned for the location of the server and the server identifier.

In an embodiment, each server of the distributed network of servers is assigned two identities (location and identifier) and the private key owner may provide configuration information including providing information that identifies the set of location(s) that are allowed to decrypt the private key, the server identifier(s) of the server(s) inside the location(s) to exclude (known as inner), and the server identifier(s) of the server(s) outside the location(s) to include (known as outer). A key encryption key (KEK) is created and split into two pieces: KEK=KEK1 XOR KEK2, and they are encrypted as follows:

(1) KEK1 is encrypted using the configured server location(s) as input to an identity-based broadcast encryption (encrypted_KEK1);

(2) KEK2 is encrypted using the configured server identifier(s) (inner) as input to an identity-based revocation encryption (encrypted_KEK2); and (3) KEK is encrypted using the configured server identifier(s) (outer) using identity-based broadcast encryption (encrypted_KEK).

The KEK is then used to encrypt the private key and the encrypted private key may be transmitted to the servers. The encrypted keys encrypted_KEK1, encrypted_KEK2, and encrypted_KEK may be transmitted to the servers. For a server to decrypt the private key, the server needs access to either KEK, or both KEK1 and KEK2. Thus, the server must be able to decrypt encrypted_KEK, or both encrypted_KEK1 and encrypted_KEK2.

For example, if the private key owner wants to allow access to the servers located within the EU region and the US region but not the London or Dallas server, and wants to allow access to the Tokyo and Sydney servers, the private key owner may configure the server locations as EU and US; the server identifiers within the regions to exclude (inner) as London and Dallas; and the server identifiers outside the regions to include (outer) as Tokyo and Sydney. As a result, all the servers within the EU and US region, except for the London and Dallas server, will be able to decrypt the private key and use it accordingly. Also, the Tokyo and Sydney servers, which are outside of the EU and US region, will be able to decrypt the private key and use it accordingly.

This allows the private key owners to choose with per-server granularity where the private keys can be locally used. If a server receives a request for a private key operation for a private key that is not configured for access at that server, then in an embodiment the server may request the private key operation be performed by a remote server that has access to the private key.

In another embodiment, each server of the distributed network of servers is assigned N identities, where N is greater than 2. For example, the identities may be location, identifier, data center tier type, server manufacturer, country, legal jurisdiction, and/or server generation. The private key owner may provide configuration information for the N identities such as specifying for each identity group, whether that identity is allowed to decrypt or not allowed to decrypt. A KEK is created and split into N pieces, where KEK is a value derived from the N pieces. For example, KEK=KEK1+KEK2+ . . . +KEK_N. As another example, KEK=hash(KEK1, KEK2, . . . KEK_N). Each i piece of the N pieces are encrypted as follows:

(1) if the configured identity value for identity i is to permit decryption for those member decryption servers, (e.g., all decryption servers with the configured identity_i value can decrypt), encrypt KEKi using the configured identity_i value as input to an identity-based broadcast encryption algorithm (encrypted_KEKi); and (2) if the configured identity value for identity_i is to prohibit decryption for those member decryption servers (e.g., all decryption servers of identity_i except those with the configured identity_i value can decrypt), encrypt KEKi using the configured identity_i value as input to an identity-based revocation encryption algorithm (encrypted_KEKi).

The private key owner may provide configuration information that overrides the configuration setting for allowing an identity to decrypt or not allowing an identity to decrypt. For instance, notwithstanding an identity i being configured so that all decryption servers of identity i except those with the configured identity_i value can decrypt, a particular identity_i value can be configured as being allowed to decrypt. KEK can itself be encrypted using the identity i with the configured identity_i value as input to an identity based broadcast encryption algorithm (encrypted_KEK).

FIG. 1 illustrates a system for encrypting and decrypting a piece of data (e.g., a private key) using identity-based broadcast encryption and identity-based revocation encryption so that only certain servers in a distributed network of servers can decrypt the piece of data.

The system 100 includes the control server 110 that is communicatively coupled to the decryption servers 130A-130J. In an embodiment, the decryption servers 130A-130J are in different geographic regions, such as in data centers located geographically. Each decryption server 130 may be part of a different data center or colocation site, and be part of a Point-of-Presence (PoP). Although not illustrated in FIG. 1, each PoP may also include one or more DNS servers (e.g., authoritative name servers, DNS proxy servers), one or more control servers, and one or more other pieces of network equipment such as router(s), switch(es), and/or hubs. The decryption servers 130A-130J may be geographically distributed as part of a content delivery network (CDN) that decreases the distance between requesting client devices and content. The decryption servers 130A-130J are grouped according to their location. For instance, the location 115 includes the decryption servers 130A-130D, the location 120 includes the decryption servers 130E and 130F, and the location 125 includes the decryption servers 130G-130J.

The decryption servers 130A-130J may be edge servers in the CDN. The decryption servers 130A-130J may operate as a reverse proxy and receive requests for network resources (e.g., HTTP requests) on the origin server 150. The decryption servers 130A-130J may have a same anycast IP address for a domain of the origin server 150. For example, if the origin server 150 handles the domain "example.com", a DNS request for "example.com" returns an address record having the anycast IP address of the servers 130A-130J. Which one of the servers 130 receives a request from a client depends on which server 130 is closest to the client in terms of routing protocol configuration (e.g., Border Gateway Protocol (BGP) configuration) according to an anycast implementation as determined by the network infrastructure (e.g., router(s), switch(es), and/or other network equipment between the client and the decryption servers 130A-130J).

The origin server 150 is a computing device on which a network resource resides and/or originates (e.g., web pages, images, word processing documents, PDF files, movie files, music files, or other computer files). The origin server 150 may contain or have local access to the private key for the domain. For example, the origin server 150 may have the private key for TLS operations for the domain "example.com".

The system 100 also includes the private key owner device 140, which is a computing device used by the private key owner or manager (or anyone having authority to configure the system as described herein), to upload the private key of the domain (e.g., a certificate for TLS operations for the domain "example.com"), and provide configuration information about which of the decryption servers 130A-130J should have access to that private key.

Although not illustrated in FIG. 1 for simplicity purposes, a client device that runs a client network application (such as a web browser, a native application, or other application that can access network resources), makes requests for a network resource. The request may be over a secure connection such as TLS and processing the request may require use of the private key.

The control server 110 controls the encryption of the piece of data. The control server 110 includes the group manager 112 that verifies the identities of the decrypters (the decryption servers 130A-130J) and issues them keys (e.g., identity-based broadcast encryption private key, identity-based revocation encryption private key). Two sets of identities may be created: one for location and one for decryption server. Each decryption server 130 therefore may have two identities: a location in which it belongs and an identify for itself.

The control server 110 also includes the encrypter 114. The encrypter 114 may implement identity-based broadcast encryption and identity-based revocation encryption. The identity-based broadcast encryption algorithm takes as input the public key of the identity group and a set of decrypter identities that are allowed to decrypt. The identity-based revocation encryption algorithm takes as input the public key of a broadcast group and a set of decrypter identities that are to be excluded from being able to decrypt.

Figure 2:
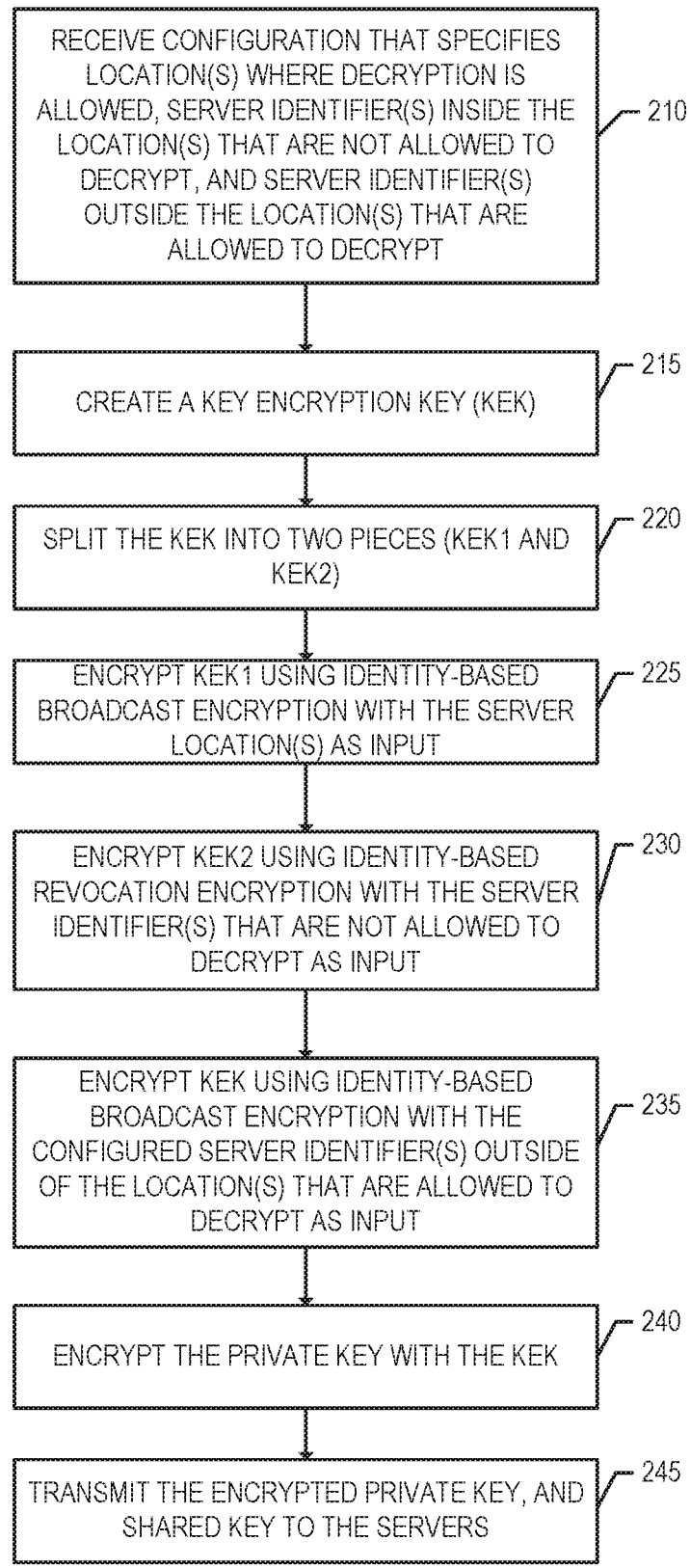
FIG. 2 is a flow diagram for encrypting a piece of data (e.g., a private key) using identity-based broadcast encryption and identity-based revocation so that only certain servers in a distributed network of servers can decrypt the piece of data, according to an embodiment.

FIG. 2 is a flow diagram for encrypting a piece of data (e.g., a private key) using identity-based broadcast encryption and identity-based revocation so that only certain servers in a distributed network of servers can decrypt the piece of data. FIG. 2 is described with respect to the exemplary embodiment of FIG. 1. However, the operations of FIG. 2 can be performed by an embodiment different than that described in FIG. 1, and the embodiment described in FIG. 1 can perform different operations than those of FIG. 2.

At operation 210, the control server 110 receives configuration that specifies location(s) where decryption of a private key is allowed (like a location whitelist), server identifier(s) inside the location(s) that are not allowed to decrypt (like a server blacklist that overrides the location whitelist), and server identifier(s) outside the location(s) that are allowed to decrypt (like a server whitelist). The configuration may be received from the owner of the private key. The configuration may be received when the owner of the private key is uploading the certificate containing the private key to the control server 110. The control server 110 may provide the location options and the server identifier options (e.g., in a drop-down list, in a graphical user interface map, etc.) for the owner to select for providing the configuration.

In an embodiment, the configuration for server identifier(s) outside the location(s) that are allowed to decrypt is optional. In such an embodiment, if that configuration is not provided, the KEK is not itself encrypted.

For example, with respect to FIG. 1, the specified configuration may specify: the location 115 as the only location in which any decryption server of the location 115 can access the private key (currently the decryption servers 130A-130D); the decryption server 130D of the location 115 cannot access the private key (even though it is included in the location 115); and the decryption servers 130E and 130G can access the private key (even though they are outside of the location 115). Accordingly, the private key should be accessible by the decryption servers 130A-130C, 130E, and 130G; and should not be accessible by the decryption servers 130D, 130F, and 130H-J. Since the location 115 is configured to allow all decryption servers within the location 115 to access the private key (with the exception of the decryption servers 130E and 130G), any new decryption server added to the location 115 will also be able to access the private key, according to an embodiment. Similarly, since the locations 120 and 125 have not been configured to allow the decryption servers within the locations to access the private key, any new decryption server added to the location 120 or 125 will also not be allowed access to the private key.

Next, at operation 215, the control server 110 creates a key encryption key (KEK). The KEK may be a random or pseudorandom symmetric key (e.g., an AES key). The KEK is used to encrypt the private key.

Next, at operation 220, the control server 110 splits the KEK into two pieces, known as KEK1 and KEK2. KEK is a value derived from the two pieces. For example, KEK=KEK1+KEK2. As another example, KEK=hash (KEK1, KEK2). Next, at operation 225, the control server 110 encrypts KEK1 using an identity-based broadcast encryption algorithm with the configured server location(s) as input, creating encrypted_KEK1, such that only decryption server devices of the server location(s) are able to decrypt encrypted_KEK1. Using the same example as above, KEK1 is encrypted using an identity-based broadcast encryption algorithm such that only the decryption servers 130A-130D can decrypt encrypted_KEK1 (that is, the decryption servers 130E-130J cannot decrypt encrypted_KEK1).

Next, at operation 230, the control server 110 encrypts KEK2 using an identity-based revocation encryption algorithm with the configured server identifier(s) within the configured location(s) that are not allowed to decrypt the private key as input, creating encrypted_KEK2, such that all decryption server devices of the configured locations except the decryption servers configured to be excluded can decrypt encrypted_KEK2. Each of the decryption servers within the set of configured location(s), except for the decryption server(s) listed in the configuration as not allowed to decrypt the private key, will be able to decrypt encrypted_KEK2. Using the same example as above, KEK2 is encrypted using an identity-based revocation encryption algorithm such that all the decryption servers within the location 115, with the exception of decryption server 130D (which was configured as being excluded), can decrypt encrypted_KEK2. Thus, the decryption servers 130A-C can decrypt encrypted_KEK2, and the decryption servers 130D-J cannot.

Next, at operation 235, the control server 110 encrypts KEK using an identity-based broadcast encryption algorithm that takes as input the configured server identifier(s) that are outside the configured location(s) that are allowed to decrypt the private key, creating encrypted_KEK, such that only the decryption server(s) identified through the server identifier(s) are able to decrypt the encrypted_KEK. Using the same example as above, KEK is encrypted using an identity-based broadcast encryption algorithm such that only the decryption servers 130E and 130G can decrypt the encrypted_KEK. Thus, the decryption servers 130A-130D, 130F, and 130H-J cannot decrypt the encrypted_KEK. Although FIG. 2 describes encrypting KEK, if there is not input of server identifier(s) outside of the configured location(s) that are allowed to decrypt the private key, KEK is not encrypted and this operation is not performed.

Next, at operation 240, the control server 110 encrypts the private key with the KEK. The order of operations 225-240 may be performed in any order.

Next, at operation 245, the control server 110 transmits the encrypted private key, and the shared key (encrypted_KEK, encrypted_KEK1, and encrypted_KEK2) to all of the decryption servers.

The decryption servers inside the location whitelist can decrypt half of the key (they can decrypt encrypted_KEK1 to reveal KEK1). However, to decrypt the private key (which is encrypted with encrypted_KEK), these decryption servers also need to be outside the server blacklist to decrypt the other half of the key (decrypt encrypted_KEK2 to reveal KEK2), to construct KEK and therefore decrypt the private key. Thus, using the above example, each of the decryption servers 130A-C can construct KEK because they each can decrypt encrypted_KEK1 and encrypted_KEK2. However, the decryption server 130D cannot construct KEK because although it can decrypt encrypted_KEK1, it cannot decrypt encrypted_KEK2. The decryption servers outside the location whitelist but on a server whitelist can decrypt encrypted_KEK to reveal KEK and use KEK to decrypt the private key. Thus, using the above example, only the decryption servers 130E and 130G can decrypt encrypted_KEK to reveal KEK.

Although FIG. 2 describes configuring decryption server(s) that are outside of the whitelisted locations as being able to access the private key, in other embodiments this is optional. If a whitelist of decryption server(s) outside of the whitelisted locations is not provided, then in an embodiment, the operation 235 is not performed.

Figure 3:
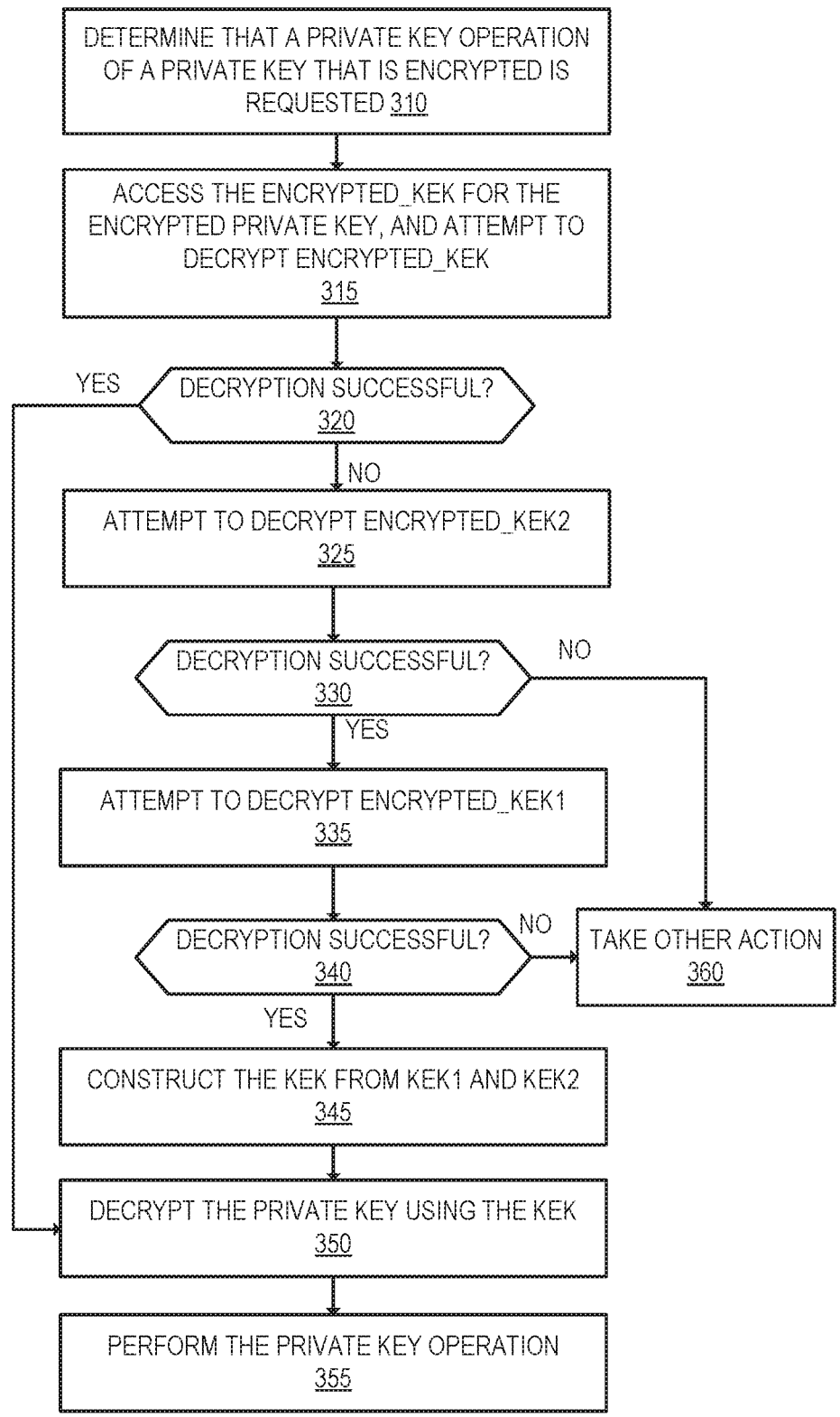
FIG. 3 is a flow diagram that illustrates exemplary operations for decrypting a piece of data (e.g., a private key) that has been encrypted using identity-based broadcast encryption and identity-based revocation so that only certain servers in a distributed network of servers can decrypt the piece of data, according to an embodiment.

FIG. 3 is a flow diagram that illustrates exemplary operations for decrypting a piece of data (e.g., a private key) that has been encrypted using identity-based broadcast encryption and identity-based revocation so that only certain servers in a distributed network of servers can decrypt the piece of data.

At operation 310, a decryption server 130 determines that a private key operation of a private key that is encrypted is requested. The private key operation may be an operation involved in a TLS handshake. For example, the private key operation may use the private key to decrypt a premaster secret that has been encrypted with a corresponding public key of a client device. As another example, the private key operation may use the private key to sign a message that contains cryptographic parameters that are used to generate the premaster secret (e.g., cipher suites that use Diffie-Hellman for the key exchange).

Next, at operation 315, the decryption server 130 access the encrypted_KEK for the encrypted private key, and attempts to decrypt the encrypted_KEK using an identity-based broadcast encryption algorithm. For instance, if the decryption server 130 is configured to decrypt the encrypted_KEK, the decryption server 130 will use the server identifier of the decryption server 130, an identity-based broadcast encryption private key assigned to the decryption server 130 by the control server 110, the header, and the identity-based broadcast encryption public key created by the control server 110, to attempt to decrypt the encrypted_KEK using identity-based broadcast encryption. This decryption will fail if the decryption server 130 was not included in the configured list of server(s) that are allowed to decrypt the private key. Then, at operation 320, if decryption was successful (revealing KEK), then flow moves to operation 350; if decryption was not successful, then flow moves to operation 325.

At operation 325, the decryption server 130 attempts to decrypt encrypted_KEK2 for the encrypted private key. For instance, if the decryption server 130 is configured to decrypt the encrypted_KEK2, the decryption server 130 will use the location of the decryption server 130, an identity-based revocation encryption private key assigned to the location of the decryption server 130, the identity-based revocation encryption public key created by the control server 110, and the revoked set of servers that are not allowed to decrypt, to attempt to decrypt the encrypted_KEK2 using identity-based revocation encryption. This decryption will fail if the decryption server 130 was included in the configured list of server(s) within the configured location(s) that are not allowed to decrypt the private key. Then, at operation 330, if decryption was successful (revealing KEK2), then flow moves to operation 335; if decryption was not successful, then flow moves to operation 360.

At operation 335, the decryption server 130 attempts to decrypt the encrypted_KEK1. For instance, if the decryption server 130 is configured to decrypt the encrypted_KEK1, the decryption server 130 will use the location identifier of the decryption server 130, an identity-based broadcast encryption private key assigned to the location of the decryption server 130 by the control server 110, the header, and the identity-based broadcast encryption public key created by the control server 110, to attempt to decrypt the encrypted_KEK1 using identity-based broadcast encryption. This decryption will fail if the decryption server 130 is not included in the configured list of location(s) that are allowed to decrypt the private key. Then, at operation 340, if decryption was successful (revealing KEK1), then flow moves to operation 345; if decryption was not successful, then flow moves to operation 360, where other action is taken.

At operation 345, the decryption server 130 constructs the KEK from KEK1 and KEK2. For example, the decryption server 130 may append KEK2 to KEK1 to form KEK. As another example, if a hash was used, the KEK1 and KEK2 may be input to the hash algorithm to form KEK. Next, at operation 350, the decryption server 130 uses the KEK to decrypt the private key. Then, at operation 355, the decryption server 130 uses the private key to perform the private key operation.

If decryption of the private key is not successful, then other action may be taken. In an embodiment, the decryption server 130 transmits a request for the private key operation to a remote server that has access to the private key, and receives a result of the private key operation from the remote server. The remote server may be the origin server 150. For instance, the decryption server 130 may transmit a request to decrypt an encrypted premaster secret (along with the encrypted premaster secret) to the remote server which in turn decrypts the encrypted premaster secret using the private key. The decryption server 130 then receives the decrypted premaster secret from the remote server. As another example, for cipher suites that use Diffie-Hellman for the key exchange, the decryption server 130 may transmit a request to the remote server to use the private key to sign a message that includes cryptographic parameters for generating the premaster secret, and receive the signed message from the remote server.

In some circumstances, the decryption keys assigned to a server may need to be rotated or revoked, such as if the decryption server or the decryption key was compromised. In an embodiment, a decryption server that is compromised is assigned new identities, and the keys that were exposed are re-encrypted. For example, if KEK1 is encrypted such that only decryption server devices of the specified server location(s) are able to decrypt encrypted_KEK1, and one of those decryption server devices was compromised, encrypted_KEK1 is revoked and a new encrypted_KEK1 is created. To revoke or rotate the keys generated for a decryption server, the new identities are used as input to the identity-based broadcast encryption algorithm to generate new encrypted keys (e.g., KEK, KEK1 . . . KEK_N as appropriate), and the old identities of that decryption server are added to the list of revoked identities to the identity-based revocation encryption algorithm for all subsequent encryptions. For instance, using the previous example where decryption server 130C is allowed access to the private key because it is a member of the location 115 and is not decryption server 130D (and thus can decrypt KEK1 and KEK2 to reveal KEK that can be used to decrypt the private key), if the KEK1 on the decryption server 130C has been compromised, the KEK1 is encrypted using the new identity for the location 115 as input to the identity-based broadcast encryption algorithm creating new encrypted_KEK1, and KEK2 is encrypted using the old identity for the location 115 as for the decryption server 130C as input in addition to configured location(s) that are not allowed to decrypt the private key as input creating new encrypted_KEK2. The new encrypted_KEK1 and the new encrypted_KEK2 are sent to the affected decryption servers (e.g., the decryption servers 130A-D).

Figure 4:
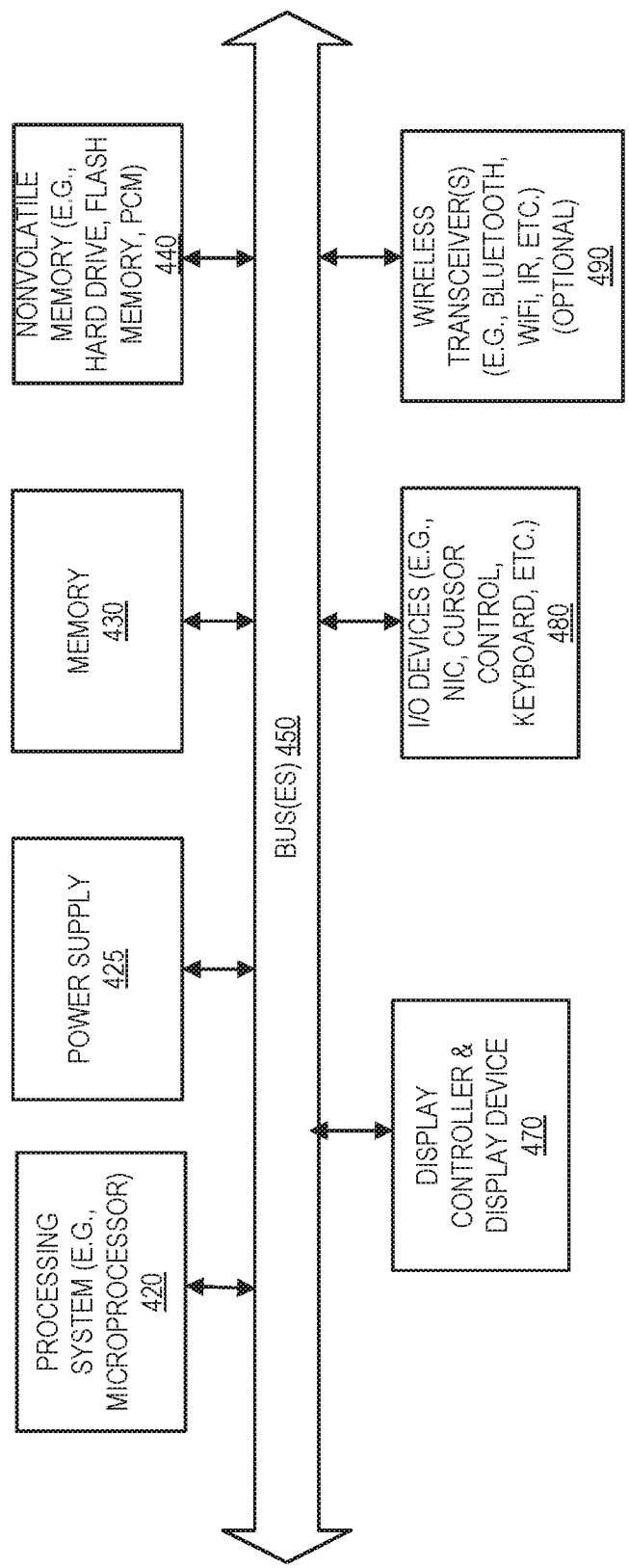
FIG. 4 is a block diagram illustrating an exemplary computer system that can be used in embodiments.

As illustrated in FIG. 4, the computing device 400, which is a form of a data processing system, includes the bus(es) 450 which is coupled with the processing system 420, power supply 425, memory 430, and the nonvolatile memory 440 (e.g., a hard drive, flash memory, Phase-Change Memory (PCM), etc.). The bus(es) 450 may be connected to each other through various bridges, controllers, and/or adapters as is well known in the art. The processing system 420 may retrieve instruction(s) from the memory 430 and/or the nonvolatile memory 440, and execute the instructions to perform operations described herein. The bus 450 interconnects the above components together and also interconnects those components to the display controller & display device 470, Input/Output devices 480 (e.g., NIC (Network Interface Card), a cursor control (e.g., mouse, touchscreen, touchpad, etc.), a keyboard, etc.), and the wireless transceiver(s) 490 (e.g., Bluetooth, WiFi, Infrared, etc.). One or more of the components of the computing device 400 may be optional (e.g., the display controller and display device 470, I/O devices 480, the wireless transceiver(s) 490, etc.). In one embodiment, the control server 110, the decryption servers 130A-130J, the origin server 150, and/or the private key owner device 140, can take the form of the computing device 400.

While embodiments have been described with respect to encrypting and decrypting a private key, similar techniques may be used to encrypt and decrypt different types of data. For example, similar techniques may be used to encrypt and decrypt session ticket encryption keys.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., a client device, a server, etc.). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory computer-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

In the preceding description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for managing access to a private key, comprising:
receiving configuration that specifies:
   a first set of one or more identities of a first set of a plurality of decryption server devices in which decryption of the private key is allowed, and
   a second set of one or more identities of a second set of the plurality of decryption server devices in which decryption of the private key is not allowed;
creating, using a symmetric key algorithm, a key encryption key (KEK), wherein the KEK is a symmetric key;
encrypting the private key with the KEK to generate an encrypted private key;
splitting the KEK into a first piece and a second piece;
encrypting the first piece using an identity-based broadcast encryption algorithm using first set of identities such that only decryption server devices of the first set of identities are able to decrypt the first piece;
encrypting the second piece using an identity-based revocation encryption algorithm using the second set of identities such that all decryption server devices except the second set of the plurality of decryption server devices identified by the second set of identities are able to decrypt the second piece; and
transmitting the encrypted private key, the encrypted first piece, and the encrypted second piece to each of the decryption server devices.

2. The method of claim 1, wherein the configuration is received from an owner or manager of the private key.

3. The method of claim 1, wherein each of the decryption server devices is anycasted to a same IP address of a domain that is bound to a certificate having the private key.

4. The method of claim 1, further comprising:
determining, at a first one of the decryption server devices, a request for a private key operation of the private key;
the first one of the decryption server devices performing the following:
   attempting to decrypt the encrypted second piece using the identity-based revocation encryption algorithm;
   determining that the encrypted second piece was successfully decrypted thereby revealing the second piece;
   attempting to decrypt the encrypted first piece using the identity-based broadcast encryption algorithm;
   determining that the encrypted first piece was successfully decrypted thereby revealing the first piece;
   constructing the KEK from the first piece and the second piece;
   decrypting the encrypted private key using the constructed KEK thereby revealing the private key; and
   performing the private key operation using the private key.

5. The method of claim 1, further comprising:
determining, at a first one of the decryption server devices, a request for a private key operation of the private key;
the first one of the decryption server devices performing the following:
   attempting to decrypt the encrypted second piece using the identity-based revocation encryption algorithm;
   determining that the encrypted second piece cannot be decrypted; and
   transmitting a request to a remote server that has access to the private key to perform the private key operation.

6. The method of claim 1, further comprising:
determining, at a first one of the decryption server devices, a request for a private key operation of the private key;

the first one of the decryption server devices performing the following:
attempting to decrypt the encrypted second piece using the identity-based revocation encryption algorithm;
determining that the encrypted second piece was successfully decrypted thereby revealing the second piece;
attempting to decrypt the encrypted first piece using the identity-based broadcast encryption algorithm;
determining that the encrypted first piece cannot be decrypted; and
transmitting a request to a remote server that has access to the private key to perform the private key operation.

7. The method of claim 1, further comprising:
receiving configuration that specifies a third set of one or more identities of a third set of the plurality of decryption server devices that are allowed to decrypt the private key;
encrypting the KEK using the identity-based broadcast encryption algorithm using the third set of identities such that only the decryption server devices identified by the third set of identities are able to decrypt the KEK; and
transmitting the encrypted KEK to each of the decryption server devices.

8. The method of claim 7, further comprising:
determining, at a first one of the decryption server devices, a request for a private key operation of the private key;
the first one of the decryption server devices performing the following:
accessing the encrypted KEK for the encrypted private key;
attempting to decrypt the encrypted KEK using the identity-based broadcast encryption algorithm;
determining that the encrypted KEK was successfully decrypted thereby revealing KEK;
decrypting the encrypted private key using KEK thereby revealing the private key; and
performing the private key operation using the private key.

9. An apparatus, comprising:
a set of one or more processors;
a non-transitory machine-readable storage medium that stores instructions that, when executed by the set of processors, cause the set of processors to perform operations for managing access to a private key including:
receiving configuration that specifies:
a first set of one or more identities of a first set of a plurality of decryption server devices in which decryption of the private key is allowed, and
a second set of one or more identities of a second set of the plurality of decryption server devices in which decryption of the private key is not allowed;
creating, using a symmetric key algorithm, a key encryption key (KEK), wherein the KEK is a symmetric key;
encrypting the private key with the KEK to generate an encrypted private key;
splitting the KEK into a first piece and a second piece;
encrypting the first piece using an identity-based broadcast encryption algorithm using first set of identities such that only decryption server devices of the first set of identities are able to decrypt the first piece;
encrypting the second piece using an identity-based revocation encryption algorithm using the second set of identities such that all decryption server devices except the second set of the plurality of decryption server devices identified by the second set of identities are able to decrypt the second piece; and
transmitting the encrypted private key, the encrypted first piece, and the encrypted second piece to each of the decryption server devices.

10. The apparatus of claim 9, wherein the configuration is received from an owner or manager of the private key.

11. The apparatus of claim 9, wherein each of the decryption server devices is anycasted to a same IP address of a domain that is bound to a certificate having the private key.

12. The apparatus of claim 9, wherein the operations further include:
determining, at a first one of the decryption server devices, a request for a private key operation of the private key;
the first one of the decryption server devices performing the following:
attempting to decrypt the encrypted second piece using the identity-based revocation encryption algorithm;
determining that the encrypted second piece was successfully decrypted thereby revealing the second piece;
attempting to decrypt the encrypted first piece using the identity-based broadcast encryption algorithm;
determining that the encrypted first piece was successfully decrypted thereby revealing the first piece;
constructing the KEK from the first piece and the second piece;
decrypting the encrypted private key using the constructed KEK thereby revealing the private key; and
performing the private key operation using the private key.

13. The apparatus of claim 9, wherein the operations further include:
determining, at a first one of the decryption server devices, a request for a private key operation of the private key;
the first one of the decryption server devices performing the following:
attempting to decrypt the encrypted second piece using the identity-based revocation encryption algorithm;
determining that the encrypted second piece cannot be decrypted; and
transmitting a request to a remote server that has access to the private key to perform the private key operation.

14. The apparatus of claim 9, wherein the operations further include:
determining, at a first one of the decryption server devices, a request for a private key operation of the private key;
the first one of the decryption server devices performing the following:
attempting to decrypt the encrypted second piece using the identity-based revocation encryption algorithm;
determining that the encrypted second piece was successfully decrypted thereby revealing the second piece;
attempting to decrypt the encrypted first piece using the identity-based broadcast encryption algorithm;
determining that the encrypted first piece cannot be decrypted; and transmitting a request to a remote server that has access to the private key to perform the private key operation.

15. The apparatus of claim 9, wherein the operations further include:
receiving configuration that specifies a third set of one or more identities of a third set of the plurality of decryption server devices that are allowed to decrypt the private key;
encrypting the KEK using the identity-based broadcast encryption algorithm using the third set of identities such that only the decryption server devices identified by the third set of identities are able to decrypt the KEK; and
transmitting the encrypted KEK to each of the decryption server devices.

16. The apparatus of claim 15, wherein the operations further include:
determining, at a first one of the decryption server devices, a request for a private key operation of the private key;
the first one of the decryption server devices performing the following:
accessing the encrypted KEK for the encrypted private key;
attempting to decrypt the encrypted KEK using the identity-based broadcast encryption algorithm;
determining that the encrypted KEK was successfully decrypted thereby revealing KEK;
decrypting the encrypted private key using KEK thereby revealing the private key; and
performing the private key operation using the private key.

17. A non-transitory machine-readable storage medium that stores instructions that, when executed by a set of processors, cause the set of processors to perform operations to manage access to a private key including:
receive configuration that specifies:
a first set of one or more identities of a first set of a plurality of decryption server devices in which decryption of the private key is allowed, and
a second set of one or more identities of a second set of the plurality of decryption server devices in which decryption of the private key is not allowed;
create, using a symmetric key algorithm, a key encryption key (KEK), wherein the KEK is a symmetric key;
encrypt the private key with the KEK to generate an encrypted private key;
split the KEK into a first piece and a second piece;
encrypt the first piece using an identity-based broadcast encryption algorithm using first set of identities such that only decryption server devices of the first set of identities are able to decrypt the first piece;
encrypt the second piece using an identity-based revocation encryption algorithm using the second set of identities such that all decryption server devices except the second set of the plurality of decryption server devices identified by the second set of identities are able to decrypt the second piece; and
transmit the encrypted private key, the encrypted first piece, and the encrypted second piece to each of the decryption server devices.

18. The non-transitory machine-readable storage medium of claim 17, wherein the configuration is to be received from an owner or manager of the private key.

19. The non-transitory machine-readable storage medium of claim 17, wherein each of the decryption server devices is to be anycasted to a same IP address of a domain that is bound to a certificate having the private key.

20. The non-transitory machine-readable storage medium of claim 17, wherein the operations further include:
determine, at a first one of the decryption server devices, a request for a private key operation of the private key;
the first one of the decryption server devices to perform the following:
attempt to decrypt the encrypted second piece using the identity-based revocation encryption algorithm;
determine that the encrypted second piece was successfully decrypted thereby revealing the second piece;
attempt to decrypt the encrypted first piece using the identity-based broadcast encryption algorithm;
determine that the encrypted first piece was successfully decrypted thereby revealing the first piece;
construct KEK from the first piece and the second piece;
decrypt the encrypted private key using the constructed KEK thereby revealing the private key; and
perform the private key operation using the private key.

21. The non-transitory machine-readable storage medium of claim 17, wherein the operations further include:
determine, at a first one of the decryption server devices, a request for a private key operation of the private key;
the first one of the decryption server devices to perform the following:
attempt to decrypt the encrypted second piece using the identity-based revocation encryption algorithm;
determine that the encrypted second piece cannot be decrypted; and
transmit a request to a remote server that has access to the private key to perform the private key operation.

22. The non-transitory machine-readable storage medium of claim 17, wherein the operations further include:
determine, at a first one of the decryption server devices, a request for a private key operation of the private key;
the first one of the decryption server devices to perform the following:
access the encrypted KEK for the encrypted private key;
attempt to decrypt the encrypted KEK using the identity-based broadcast encryption algorithm;
determine that the encrypted KEK cannot be decrypted;
attempt to decrypt the encrypted second piece using the identity-based revocation encryption algorithm;
determine that the encrypted second piece was successfully decrypted thereby revealing the second piece;
attempt to decrypt the encrypted first piece using the identity-based broadcast encryption algorithm;
determine that the encrypted first piece cannot be decrypted; and
transmit a request to a remote server that has access to the private key to perform the private key operation.

23. The non-transitory machine-readable storage medium of claim 17, wherein the operations further include:
receive configuration that specifies a third set of one or more identities of a third set of the plurality of decryption server devices that are allowed to decrypt the private key;
encrypt the KEK using the identity-based broadcast encryption algorithm using the third set of identities such that only the decryption server devices identified by the third set of identities are able to decrypt the KEK; and
transmit the encrypted KEK to each of the decryption server devices.

24. The non-transitory machine-readable storage medium of claim 23, wherein the operations further include:
- determine, at a first one of the decryption server devices, a request for a private key operation of the private key;
- the first one of the decryption server devices to perform the following:
  - access the encrypted KEK for the encrypted private key;
  - attempt to decrypt the encrypted KEK using the identity-based broadcast encryption algorithm;
  - determine that the encrypted KEK was successfully decrypted thereby revealing KEK;
  - decrypt the encrypted private key using KEK thereby revealing the private key; and
  - perform the private key operation using the private key.

* * * * *